(12) United States Patent
Chang et al.

(10) Patent No.: US 10,291,610 B2
(45) Date of Patent: May 14, 2019

(54) SYSTEM AND METHOD FOR BIOMETRIC AUTHENTICATION USING SOCIAL NETWORK

(71) Applicant: VISA INTERNATIONAL SERVICE ASSOCIATION, San Francisco, CA (US)

(72) Inventors: Michael Chang, Fremont, CA (US); Luba Goldberg, San Francisco, CA (US); Neil Mumm, San Francisco, CA (US); Stephanie Tsimis, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 132 days.

(21) Appl. No.: 14/970,361

(22) Filed: Dec. 15, 2015

(65) Prior Publication Data

US 2017/0171195 A1    Jun. 15, 2017

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06Q 20/4016* (2013.01);
(Continued)

(58) Field of Classification Search
None
See application file for complete search history.

(56) References Cited

U.S. PATENT DOCUMENTS 6,819,219 B1    11/2004    Bolle et al.
7,565,329 B2    7/2009    Lapsley et al.
(Continued)

FOREIGN PATENT DOCUMENTS

WO    2007143441    12/2007
WO    2011017653    2/2011

OTHER PUBLICATIONS

PCT Written Opinion and International Search Report dated Jan. 25, 2017 in connection with PCT Application No. PCT/US2016/058129, 11 pgs.
(Continued)

*Primary Examiner* — Andrew J Steinle
(74) *Attorney, Agent, or Firm* — Kilpatrick Townsend & Stockton LLP

(57) ABSTRACT

Techniques described herein include systems and methods for biometric authentication utilizing a dynamically updated biometric template derived from social media content of a user. In some embodiments, a service provider computer receives an authentication request that comprises biometric data provided by the user utilizing a user device. Social media content associated with the user may be received by the service provider computer from a social network service computer. In embodiments, the service provider computer may generate a biometric template for the user based on the received social media content where the biometric template is continually updated based on new social media content shared by the user. The service provider computer may determine a confidence score based on a comparison of the biometric data and the biometric template. The service provider computer may verify the authentication request for the user based at least in part on the confidence score.

17 Claims, 8 Drawing Sheets

(51) Int. Cl.
    *G06Q 20/40*     (2012.01)
    *H04L 29/08*     (2006.01)
    *G06Q 50/00*     (2012.01)

(52) U.S. Cl.
    CPC ....... *G06Q 20/40145* (2013.01); *G06Q 50/01* (2013.01); *H04L 63/0884* (2013.01); *H04L 67/10* (2013.01)

(56) References Cited

U.S. PATENT DOCUMENTS

| | | | |
|---|---|---|---|
| 8,255,698 B2 | 8/2012 | Yuk | |
| 8,661,516 B2 | 2/2014 | Yamada | |
| 2010/0115114 A1* | 5/2010 | Headley | G06F 21/32 709/229 |
| 2010/0162386 A1* | 6/2010 | Li | G06F 21/32 726/19 |
| 2010/0325218 A1* | 12/2010 | Castro | G06Q 50/01 709/206 |
| 2011/0209192 A1* | 8/2011 | LeClerc | G06F 21/32 726/1 |
| 2012/0218074 A1* | 8/2012 | Luckhardt | G07C 9/00087 340/5.52 |
| 2014/0289820 A1 | 9/2014 | Lindemann | |
| 2014/0349747 A1 | 11/2014 | Leyvand et al. | |
| 2014/0358954 A1* | 12/2014 | Kocher | G10K 11/346 707/758 |
| 2015/0358318 A1* | 12/2015 | Spio | H04L 63/0861 726/7 |
| 2016/0219046 A1* | 7/2016 | Ballard | H04L 63/0861 |

OTHER PUBLICATIONS

EP16876229.2 , "Extended European Search Report", dated Nov. 26, 2018, 8 pages.

Gomes De Andrade et al., "All the Better to See You With, My Dear: Facial Recognition and Privacy in Online Social Networks", Security & Privacy, IEEE, IEEE Service Center, vol. 11, No. 3, May 1, 2013, pp. 21-28.

PCT/US2016/058129 , "International Preliminary Report on Patentability", dated Jun. 28, 2018, 10 pages.

* cited by examiner

SYSTEM AND METHOD FOR BIOMETRIC AUTHENTICATION USING SOCIAL NETWORK

CROSS-REFERENCES TO RELATED APPLICATIONS

NOT APPLICABLE

BACKGROUND

Identity fraud in the consumer transaction service industry is a problem. For example, many consumers can complete a transaction using a consumer device (e.g., a mobile phone or laptop computer) without visiting a brick-and-mortar merchant or presenting a physical payment card. In some examples, a user can initiate a payment transaction from the consumer device at a point-of-sale-terminal, in a remote payment environment, or online via e-commerce web pages. Some consumer device initiated transactions may require biometric authentication to verify the identity of the user. Some previously implemented systems attempt to decrease fraud in these transactions by utilizing biometric authentication that uses a stored static biometric template. For example, a static biometric template (e.g., based on a fingerprint) can be stored on the user device and compared for matching to recently submitted biometric data making it harder for fraudsters to compromise the identity verification. However, such methods for biometric authentication may utilize a non-revocable biometric template that fails to adjust or update based on the age or activity of the user that a service is attempting to authenticate. As such, a fraudster can obtain a sample of the biometric data (e.g., fingerprint) and fraudulently identify as the user in a process that compares the biometric data to a static or non-revocable biometric template. Moreover, systems that store the biometric template on a payment transaction server or merchant computer may be prone to compromise thus destroying any protection granted by requiring biometric authentication.

Embodiments of the invention address these and other problems individually and collectively.

BRIEF SUMMARY

In some embodiments of the invention, systems and methods for biometric authentication are provided. The biometric authentication system can utilize a biometric template that is generated based at least in part on social media content shared by or associated with a user from a social media network provider. Systems can strengthen the established identity of the user by utilizing a revocable biometric for generating the biometric template that reflects changes in the user due to age or activity. In some embodiments, biometric data provided by a user during authentication can be matched with the dynamic biometric template to verify the identity of the user. The dynamic biometric template can be generated and stored on the user device, on a social media network provider's server, or a service provider computer. In some embodiments, the comparison or determination of a confidence score that represents a match between biometric data provided by a user during authentication and the dynamic biometric template can be performed on the user device, on the social media network provider's server, or the service provider computer. The confidence score may be compared to a threshold to determine that the user's identity is verified or authenticated.

Some embodiments of the invention are directed to a method for biometric authentication including receiving, by a server computer and from an access device, an authentication request that comprises biometric data provided by a user. The method may further include transmitting, by the server computer, the biometric data to a social network server computer. The social network server computer may thereafter compare the biometric data of the user to a biometric template to calculate a confidence score. In some embodiments, the biometric template may be generated based at least in part on social media content shared by the user on a Web Site provided by the social network server computer. The method may also include receiving, by the server computer, the confidence score from the social network server computer and verifying the authentication request based at least in part on the confidence score.

In some embodiments, the method may also include creating a fraud score based at least in part on the confidence score and a threshold and updating a fraud database using the fraud score. The fraud database may be maintained by the server computer.

In some embodiments, the authentication request is in the form of an authorization request message that requests authorization for a payment transaction, wherein the method further includes transmitting, by the server computer, an authorization response message to the access device.

In some embodiments, the method may further comprise determining, by the server computer, a threshold for the payment transaction based at least in part on transaction information provided by a merchant associated with the payment transaction. In some embodiments, the threshold is updated based at least in part on the social media content shared by the user.

In some embodiments, the method may also include calculating the confidence score based at least in part on information indicating a level of activity of the user with the Web Site provided by the social network server computer.

In some embodiments, the social media content shared by the user on the Web Site includes at least one of video content, audio content, image content, text content, user provided input, or user provided activity with the Web Site.

In some embodiments, the biometric data is provided by the user via a user device. In some embodiments, the method may also include that the biometric template is dynamically updated based on new social media content shared by the user on the Web Site provided by the social network server computer.

Some embodiments of the invention are directed to a method for biometric authentication including receiving, at a server computer and from an access device, an authentication request for a user associated with the access device where the authentication request comprises biometric data provided by the user. The method may further include receiving, by the server computer and from a social network service computer, social media content associated with the user. The method may also include generating, by the server computer, a biometric template for the user based at least in part on the social media content. In some embodiments, the biometric template may be continually updated based at least in part on new social media content associated with the user. The method may include determining, by the server computer, a confidence score based at least in part on the biometric data and the biometric template and verifying the authentication request for the user based at least in part on the confidence score.

In some embodiments, the method may further include selecting, by the server computer, a threshold from one or more thresholds to verify the authentication request based at least in part on information identifying characteristics of the authentication request.

In some embodiments, the biometric template is updated at periodic intervals.

Other embodiments of the invention are directed to servers and systems that are configured to perform the above-described methods.

These and other embodiments of the invention are described in further detail below.

BRIEF DESCRIPTION OF THE DRAWINGS

Various embodiments in accordance with the present disclosure will be described with reference to the drawings, in which.

DETAILED DESCRIPTION

Figure 1:
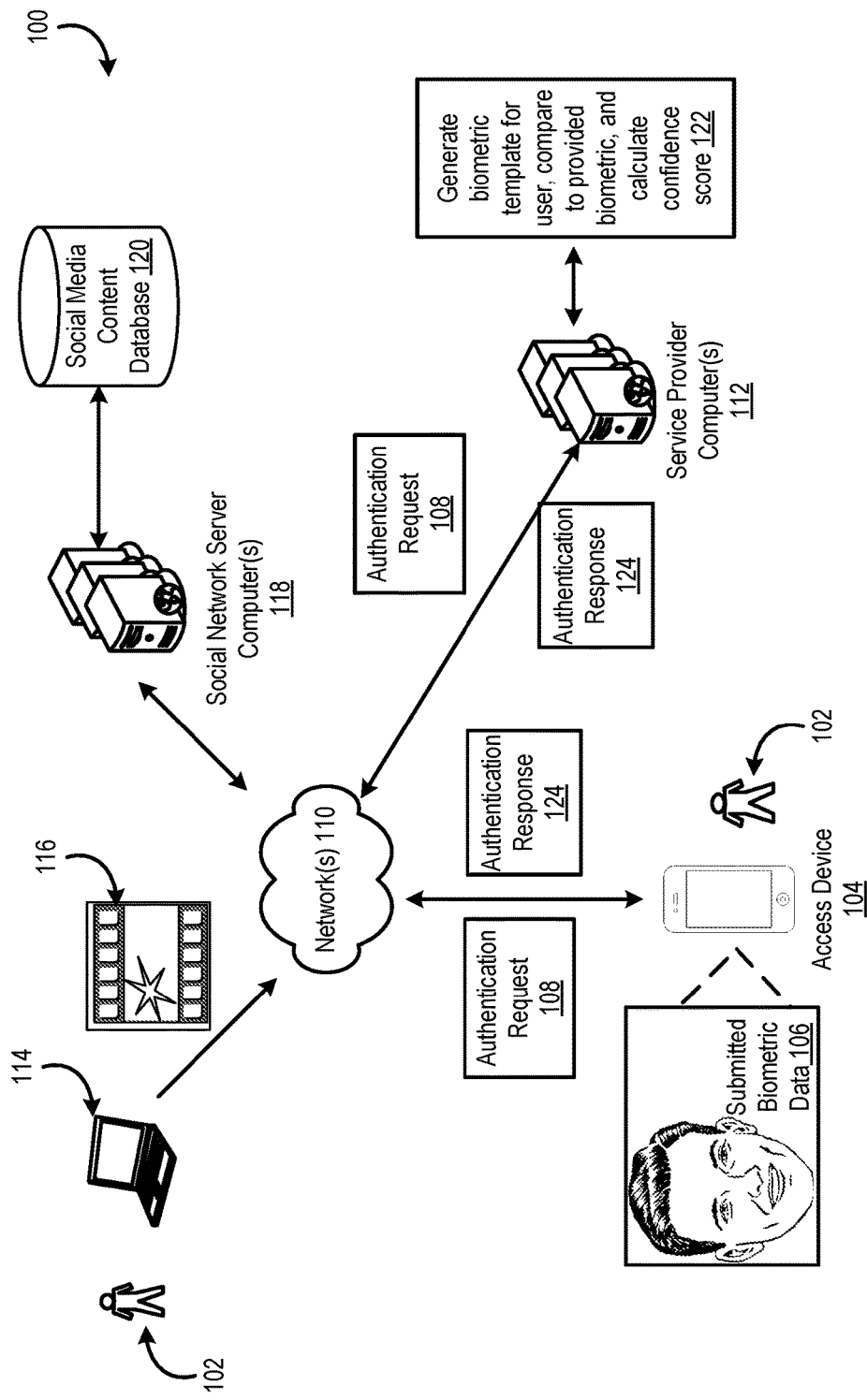
FIG. 1 depicts an example system illustrating an authentication process utilizing a server implemented biometric authentication system with a generated biometric template from social media content of a user, comprising a number of components and in accordance with some embodiments of the invention.

Prior to discussing embodiments of the invention descriptions of some terms may be helpful in understanding embodiments of the invention.

A "payment device" may include any suitable device capable of making a payment. For example, a payment device can include a card including a credit card, debit card, charge card, gift card, or any combination thereof. A payment device can be used in conjunction with a consumer device, user device, or user computer device as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" may be an electronic message that is sent to an authorization system such as a payment processing network and/or an issuer computer to request authorization for a transaction. An authorization request message is an example of a transaction message. An authorization request message according to some embodiments may comply with ISO 8583, which is a standard for systems that exchange electronic transaction information associated with a payment made by a consumer using a payment device or a payment account. The authorization request message may comprise a primary account number (PAN), expiration date, service code, CVV and other data from a payment device. In some embodiments of the invention, an authorization request message may include a payment token (e.g., a substitute or pseudo account number), an expiration date, a token presentment mode, a token requestor identifier, an application cryptogram, and an assurance level data. The payment token may include a payment token issuer identifier that may be a substitute for a real issuer identifier for an issuer. For example, the real issuer identifier may be part of a BIN range associated with the issuer. An authorization request message may also comprise additional data elements including, by way of example only: a service code, a CVV (card verification value), a dCVV (dynamic card verification value), an expiration date, etc.

An "authorization response message" may be an electronic message reply to an authorization request message generated by the authorization system. The authorization response message may include an authorization code, which may be a code that the authorization system returns in response to receiving an authorization request message (either directly or through the payment processing network). The authorization response message is received at the merchant's access device (e.g. POS terminal) and can indicate approval or disapproval of the transaction by the authorization system.

A "server computer" may be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. A user device computer, social network provider computer, or service provider computer may all be examples of server computers.

An "access device" can include a device that allows for communication with a remote computer, and can include a device that enables a customer to make a payment to a merchant in exchange for goods or services. An access device can include hardware, software, or a combination thereof. Examples of access devices include point-of-sale (POS) terminals, mobile phones, tablet computers, laptop or desktop computers, user device computers, user devices, etc.

"Biometric data" includes data that can be used to uniquely identify an individual based upon one or more intrinsic physical or behavioral traits. For example, biometric data may include retinal scan and tracking data (i.e., eye movement and tracking where a user's eyes are focused). Further examples of biometric data include digital photographic data (e.g., facial recognition data), digital sound data (e.g., voice recognition data), deoxyribonucleic acid (DNA) data, palm print data, hand geometry data, and iris recognition data.

A "biometric template" can be a digital reference of characteristics that have been extracted from one or more biometric samples. In some embodiments, the biometric samples may be derived from social media content shared by or associated with a user. In some embodiments, a biometric template may be derived from biometric data. A biometric template as used herein includes biometric templates for revocable and non-revocable features associated with a user such as facial images and voice samples. Examples of non-revocable features associated with a user include a fingerprint. Biometric templates are used during the biometric authentication process. Data from a biometric sample provided by a user at the time of authentication can be compared against the biometric template to determine whether the provided biometric sample closely matches the biometric template.

A "resource providing entity" can be any entity that provides resources during a transaction. For example, a resource providing entity can be a merchant, a venue operator, a building owner, a governmental entity, etc.

An "authentication request" includes a request to authenticate a person or circumstance. The authentication request may be an electronic message that is sent to a service provider computer or an authorization system such as a payment processing network and/or an issuer computer to request verification of a user identity. In some embodiments, an authorization request can be an example of an authorization request message that is an example of a transaction message. The authorization request may comprise biometric data provided by a user for verification of the user's identity before a transaction or authentication request message is generated. In some embodiments, the authentication request includes access device or user computer device identification information, user location information, network access information, or an application request. As described herein, a user's identity may be verified upon receiving an authentication request by comparing submitted biometric data to a biometric template that is generated using social media content that is shared by or associated with the user.

"Social media content" includes any suitable activity shared or provided by a user in conjunction with a social media service that is provided or hosted by a social media provider. For example, social media content may include any images, video, text, audio, user activity, links, or upload activity by a user utilizing a Web Site or software application that is provided by a social media provider. Further, social media content may include suitable content shared or provided by the user with a social media service including video content, audio content, image content, text content, user provided input, or user provided activity with an associated Web Site or application of a social media service. In some embodiments, social media content may be associated with or provided by the user utilizing an application provided by the social media provider. Examples of social media providers include FACEBOOK, INSTAGRAM, TWITTER, SNAPCHAT, ETSY, MYSPACE, GOOGLE PLUS, or any suitable social media outlet.

A "confidence score" can include a value or metric that represents trust in a particular situation. For example, a confidence score may relate to the degree of similarity between biometric data provided by the user and a dynamic biometric template derived from social media content. In some embodiments, the confidence score represents how closely the biometric data matches the biometric template. In some embodiments, the confidence score can be compared to one or more thresholds maintained by a service provider or payment processing network to determine whether the user identity is verified as part of a payment transaction process. In embodiments, the confidence score can be modified based on information that indicates a level of activity of a corresponding user with their associated social media networks. For example, the confidence score may be weighted greater if a user is active and provides a large amount of data to a social media source whereas a user who is less active and does not share much information via associated social media networks may be weighted differently.

A "user device" may be any type of computing device such as, but not limited to, a mobile phone, a smart phone, a personal digital assistant (PDA), a laptop computer, a desktop computer, a server computer, a thin-client device, a tablet PC, a vehicle such as an automobile, etc. Additionally, user devices may be any type of wearable technology device, such as a watch, earpiece, glasses, etc. A user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), WI-FI, Wi-Max, or any other communication medium that may provide access to a network such as the Internet or a private network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and platform for biometric authentication. The biometric authentication system can utilize a biometric template that is generated based at least in part on social media content shared by or associated with a user from a social media network provider. Systems can strengthen the established identity of the user by utilizing a revocable biometric for generating the biometric template that reflects changes in the user due to age or activity. In some embodiments, biometric data provided by a user during authentication can be matched with the dynamic biometric template to verify the identity of the user.

FIG. 1 depicts an exemplary system according to an embodiment of the invention.

Embodiments of the invention can include an authentication process utilizing a server implemented biometric authentication system with a generated biometric template from social media content of a user, comprising a number of components and in accordance with some embodiments of the invention. The process 100 illustrated in FIG. 1 includes a user 102 utilizing an access device 104 to submit biometric data 106 as part of an authentication request 108 to verify the user 102 or the access device 104. For example, the authentication request 108 may be part of a payment transaction for a payment process. As depicted in FIG. 1, the user 102 submits the biometric data 106 (a picture of the user's face)

to service provider computers 112. In some embodiments, the service provider computers 112 implement or provide resources for implementing the features for biometric authentication as described herein. In other embodiments, the service provider computers 112 may be associated with an issuer of a payment instrument, a payment processing network associated with the payment instrument, a trusted third party, a digital wallet provider, a token requestor, and/or any other suitable entity. In some embodiments, the user 102 may utilize components, software, or hardware capabilities of the access device 104 to submit the biometric data 106 for authorization. For example, in FIG. 1, the user 102 may utilize a camera of the access device 104 to take a selfie or picture of themselves to submit with the authentication request 108.

Previously, the user 102 may have utilized a user device 114 to provide a digital video 116 (or one or more pictures) of themselves to a social network server computer 118 via the network 110. The submission of social media content (such as digital video 116) to the social network server computer 118 may have occurred previously, subsequently, concurrently, or asynchronously with the authentication request 108 by the user. In some embodiments, the social network server computer 118 may store the social media content (i.e., digital video 116) provided by the user 102 or associated with the user 102 in a social media content database 120. It should be noted that although FIG. 1 illustrates the user utilizing an access device 104 to make an authentication request 108 and a user device 114 to submit, share, or provide social media content, embodiments described herein include the user 102 utilizing either device (104 or 114) to both submit social media content and the authentication request 108. In some embodiments, the social network server computers 118 may provide, host, or maintain a social media Web Site or software application that the user 102 utilizes to submit, provide, or share social media content. The social network server computers 118 may maintain and update the social media content for each user of a plurality of users that share content utilizing their social media provided service in the social media content database 120.

In some embodiments, the service provider computer 112 may authenticate or verify the identity of the user 102 in response to receiving the authentication request 108. The service provider computer 112 may request, receive, or obtain the social media content (i.e., digital video 116) provided by the user 102 from the social network server computers 118 via network 110. In some embodiments, the service provider computer 112 may receive the social media content associated with the user 102 from the social network server computer 118 by invoking an application program interface (API) call that is provided by the social network server computer 118 to share such information with entities such as service provider computer 112. In some embodiments, the service provider computer 112 and social network server computer 118 may perform some form of authentication to ensure that sensitive data is not provided to unwanted parties. Further, the service provider computer 112 and social network server computer 118 may communicate the requested data via encrypted communications utilizing public-private encryption key pairs shared between the service provider computer 112 and social network server computer 118.

In some embodiments, the service provider computer 112 may utilize the social media content associated with the user 102 to generate a dynamic biometric template 122 for comparison to the submitted biometric data 106. In some embodiments, the service provider computer 112 may calculate a confidence score that represents the similarity or degree of matching between the biometric data 106 and the dynamic biometric template 122. The use of the dynamic biometric template 122 accounts for revocable biometric features of the user 102 (such as facial image data or voice data of the user 102). The use of revocable modalities may benefit the user in ensuring a greater degree of verification and authentication as revocable modalities such as facial image recognition are strengthened as a user's face changes over time. Moreover, a stronger dynamic biometric template 122 may be generated based on the amount of social media content associated with the user and can account for variations in how the biometric content was captured (i.e., lighting conditions and facial expressions). The service provider computer 112 may maintain the dynamic biometric template 122 and continually update (e.g., daily, each time a new image or video is provided, monthly, etc.) the dynamic biometric template 122 based on new or updated social media content received from the social network server computer 118. The dynamic biometric template 122 may be updated periodically by the service provider computer 112.

In some embodiments, the service provider computer 112 may determine an authentication response 124 based on the confidence score and a threshold. For example, the service provider computer 112 may maintain one or more thresholds for an authentication request based on characteristics of the authentication request or a payment transaction. A first threshold may be utilized based on information identifying the location of the user 102 or the access device 104 requesting authentication 108. A second threshold may be utilized for payment transactions that exceed or fall below a certain monetary amount. Other examples of thresholds are described herein. In embodiments, the authentication response 124 may indicate that the user's 102 identity or access device 104 is verified. In some embodiments, the authentication response 124 may be utilized as part of an authentication request message and authentication response message payment processing or payment transaction process. In some embodiments, the service provider computer 112 may generate a fraud score based on the comparison of the confidence score and the threshold. The fraud score may represent when authentication requests were verified or not verified. The fraud scores for a plurality of user's authentication requests may be tracked by the service provider computer 112 and be continually updated based on new authentication requests. In some embodiments, the service provider computer 112 may take one or more actions based on the fraud score such as informing merchants, issuer, and users of potential fraud.

In some embodiments, as described herein, the social network server computer 118 may generate and maintain the dynamic biometric template 122, perform the comparison of the biometric data 106 and the dynamic biometric template 122, and calculate the confidence score for subsequent provisioning to the service provider computer 112. In some embodiments, the access device 104 or user device 114 may be configured to utilize an application provided by the service provider computer 112 to generate and maintain the dynamic biometric template 122, perform the comparison of the biometric data 106 and the dynamic biometric template 122, and calculate the confidence score. The network 110 may include a wireless network, WI-FI, Wi-Max, wireless data network (e.g., 3G, 4G, or similar networks), or any other communication medium that may provide access to a public or private network.

Figure 2:
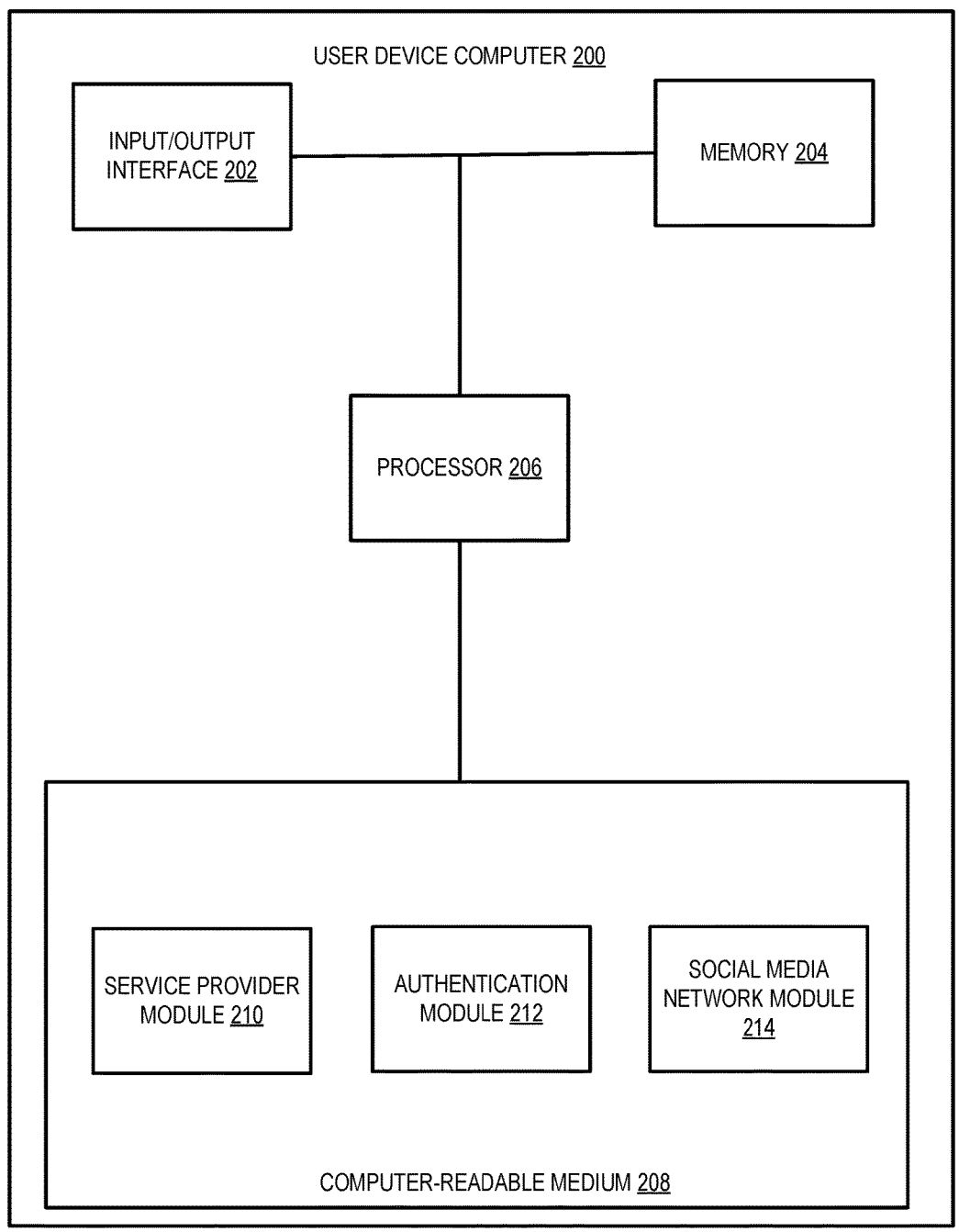
FIG. 2 depicts a block diagram of a user device computer, in accordance with some embodiments of the invention.

FIG. 2 depicts a block diagram of a user device computer 200, in accordance with some embodiments of the invention. The user device computer 200 includes an input/output interface 202, memory 204, a processor 206, and computer readable medium 208. The user device computer 200 may be an example of access device 104 from FIG. 1.

The input/output (I/O) interface 202 is configured to receive and transmit data. For example, the I/O interface 202 may receive the user submitted biometric data 106 from the access device 104 (FIG. 1) or user submitted social media content for sharing with the social network server computer 118 (FIG. 1). In another example, the I/O interface 202 may transmit the biometric data 106 to the service provider computer 112 (FIG. 1) or the social network server computer 118 (FIG. 1). The I/O interface 202 may also be used for direct interaction with the service provider computer 112 or social network server computer 118. The I/O interface 202 may accept input from an input device such as, but not limited to, a keyboard, keypad, camera, microphone, mouse, or any other suitable input hardware and/or software associated with the user device computer 200 for capturing biometric data. Further, the I/O interface may display output on a display device.

Memory 204 may be any magnetic, electronic, or optical memory. It can be appreciated that memory 204 may include any number of memory modules. An example of memory 204 may be dynamic random access memory (DRAM).

Processor 206 may be any general-purpose processor operable to carry out instructions on the user device computer 200. The processor 206 is coupled to other units of the user device computer 200 including input/output interface 202, memory 204, and computer-readable medium 208.

Computer-readable medium 208 may be any magnetic, electronic, optical, or other computer-readable storage medium. Computer-readable storage medium 208 includes service provider module 210, authentication module 212, and social media network module 214.

The service provider module 210 may be configured to, when executed by processor 206, generate a dynamic biometric template utilizing social media content associated with a user, calculate a confidence score based on the comparison of submitted biometric data to the dynamic biometric template, and generate an authentication request to verify the identity of the user or the user device computer 200. After receiving the authentication request, the service provider module 210 may obtain and process the biometric data provided by the user requesting authentication. The service provider module 210 may then calculate the confidence score for the comparison of the biometric data to the generated dynamic biometric template. The service provider module 210 may facilitate the various transmitting and receiving of data by interfacing with I/O interface 202. In some embodiments, the service provider module 210 may generate and maintain the dynamic biometric template in an offline mode or depending on network conditions of the user device computer 200. For example, content received by the social media network module 214 may be utilized to update and/or generate the dynamic biometric template when the user device computer 200 is not connected to an available network (offline mode) or periodically as described above in FIG. 1.

The social media network module 214 may be configured to, when executed by processor 206, request, receive, or obtain social media content from a social media network server or social media provider computer. The social media content may be provided or associated with the user of the authentication request. The social media network module 214 may generate the dynamic biometric template based at least in part on the social media content. The type of dynamic biometric template generated and stored may be based on the biometric data submitted by the user via the service provider module 210 during the authentication request process. The social media network module 214 may store the biometric template in memory 204 or in the computer-readable storage medium 208 in a protected sector that is only accessible by the social media network module 214. The social media network module 214 may maintain and update the biometric template based on new social media content provided or shared by the user with the social media network. In embodiments, the biometric template may be stored in a secure element of the user device. Secure elements may include a component of the user device or associated components that have been certified by the authentication service provider described herein as secure. The service provider may hold root access to the secure element and manage the secure element's lifecycle including creating security domains and sharing access keys with issuers.

The authentication module 212 may be configured to, when executed by processor 206, generate an authentication response or verify the authentication request based on the confidence score calculated by the service provider module 210 and one or more thresholds. The authentication module 212 may maintain a plurality of thresholds for authenticating an authentication request on behalf of a user or user device. In some embodiments, the authentication module 212 may be configured to select an appropriate threshold for authentication purposes. The authentication module 212 may utilize location information identified in the social media content from the social media network module 214 to select an appropriate threshold for comparison to the calculated confidence score. For example, a user may have interacted with a social network application to provide input about a merchant at a particular location. Subsequently an authentication request associated with the same merchant or merchant location may be processed by the modules 210-214. The social media activity of the user for the merchant and the merchant location may be utilized to select a higher or lower threshold where appropriate to determine authentication. In embodiments where the authentication request is part of a payment transaction processing, the authentication module 212 may select a particular threshold based on the monetary amount for the transaction. For example, a higher threshold may be selected for a large monetary transaction (>$300.00) whereas a lower threshold may be selected for a small monetary transaction (<$50.00). In some embodiments, when a user registers or opts-in for the service described herein, utilizing biometric authentication with a dynamically generated biometric template from social media content, the user can set preferences for the monetary amount and thresholds described herein. In some embodiments, the authentication module 212 may generate a request for a secondary authentication from the user, beyond submitting biometric data. For example, for certain authentication requests or payment transaction processes, the authentication module 212 may request that the user submit a password, PIN, or answer a security question.

Figure 3:
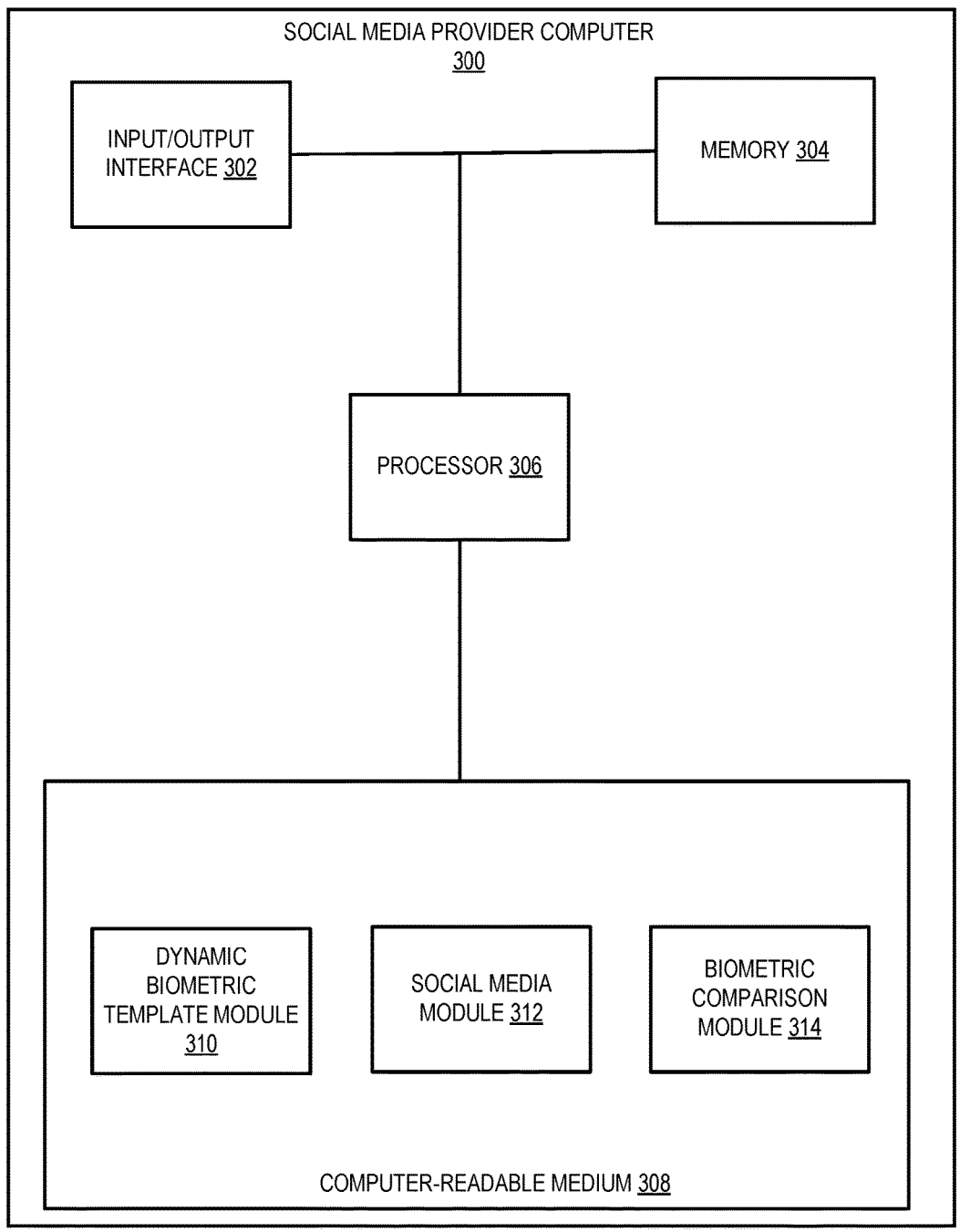
FIG. 3 depicts a block diagram of a social media provider computer, in accordance with some embodiments of the invention.

FIG. 3 depicts a block diagram of a social media provider computer 300, in accordance with some embodiments of the invention. The social media provider computer 300 includes an input/output interface 302, memory 304, a processor 306, and computer readable medium 308. The social media provider computer 300 may be an example of social network server computers 118 from FIG. 1.

The input/output (I/O) interface 302 is configured to receive and transmit data. For example, the I/O interface 302 may receive the user submitted biometric data 106 from the access device 104 (FIG. 1) or user submitted social media content (i.e., digital video 116 from user device 114 and user 102) (FIG. 1). In another example, the I/O interface 302 may transmit a calculated confidence score or the dynamic generated biometric template to the service provider computer 112 (FIG. 1) or the access device 104 (FIG. 1). The I/O interface 302 may also be used for direct interaction with the service provider computer 112 or access device 104. The I/O interface 302 may accept input from an input device such as, but not limited to, a keyboard, keypad, camera, microphone, mouse, or any other suitable input hardware and/or software associated with the social media provider computer 300 for capturing biometric data or network interfaces for receiving and processing social media content provided or shared by the user. Further, the I/O interface may display output on a display device.

Memory 304 may be any magnetic, electronic, or optical memory. It can be appreciated that memory 304 may include any number of memory modules. An example of memory 304 may be dynamic random access memory (DRAM).

Processor 306 may be any general-purpose processor operable to carry out instructions on the user device computer 300. The processor 306 is coupled to other units of the social media provider computer 300 including input/output interface 302, memory 304, and computer-readable medium 308.

Computer-readable medium 308 may be any magnetic, electronic, optical, or other computer-readable storage medium. Computer-readable storage medium 308 includes dynamic biometric template module 310, social media module 312, and biometric comparison module 314.

The social media module 312 may be configured to, when executed by processor 306, receive and process social media content shared and or provided by a user with a Web Site or software application provided and/or associated with the social media provider computer 300. In some embodiments, the social media module 312 may maintain and update the social media content provided/shared by the user. The social media module 312 may be configured to categorize the social media content based on the a file type or content type. For example, the social media module 312 may maintain multiple categories of social media content such as image content, video content, audio content, text content, uploaded content, social media network activity or interactivity by the user, or any other suitable content associated with a social media Web Site or software application. In some embodiments, the social media module 312 may store the social media content of a user in the computer-readable storage medium 308 or in a database associated with or accessed by the social media provider computer 300.

The dynamic biometric template module 310 may be configured to, when executed by processor 306, receive and process an authentication request for a user or user device as described herein. The dynamic biometric template module 310 may generate, maintain, and update a dynamic biometric template for a user based at least in part on the social media content from the social media module 312. The dynamic biometric template module 310 may generate and maintain a plurality of dynamic biometric templates based on the biometric data and social media content provided for a user. For example, if a user only submits digital images, including the face of the user, then the dynamic biometric template module 310 may only generate and maintain a dynamic biometric template of a facial image for the user.

The dynamic biometric template module 310 may periodically update the dynamic biometric template based on new or different social media content associated with the user. The dynamic biometric template module 310 may store the dynamic biometric template in the computer-readable storage medium 308.

The biometric comparison module 314 may be configured to, when executed by processor 306, compare the biometric data submitted with the authentication request for the user or user device to the dynamically generated biometric template from the dynamic biometric template module 310. In some embodiments, the biometric comparison module 314 may calculate or determine a confidence score that represents the degree of matching or similarity between the biometric data of the user and the dynamically generated biometric template for the user for an authentication request. In some embodiments, the biometric comparison module 314 may facilitate the various transmitting of the calculated confidence score by interfacing with I/O interface 302. For example, the biometric comparison module 314 may transmit the calculated confidence score of the matching between the biometric data and the biometric template to the service provider computer 112 or the access device 104. The confidence score may be transmitted to the service provider computer 112 or to a software application on the access device 104 provided by the service provider computer 112 for verifying the authentication response and providing an authentication response, as described herein. In some embodiments, the modules 310-314 may be configured to perform the same capabilities of modules 210-214 and the modules 210-214 may be configured to perform the same capabilities of module 310-314.

Figure 4:
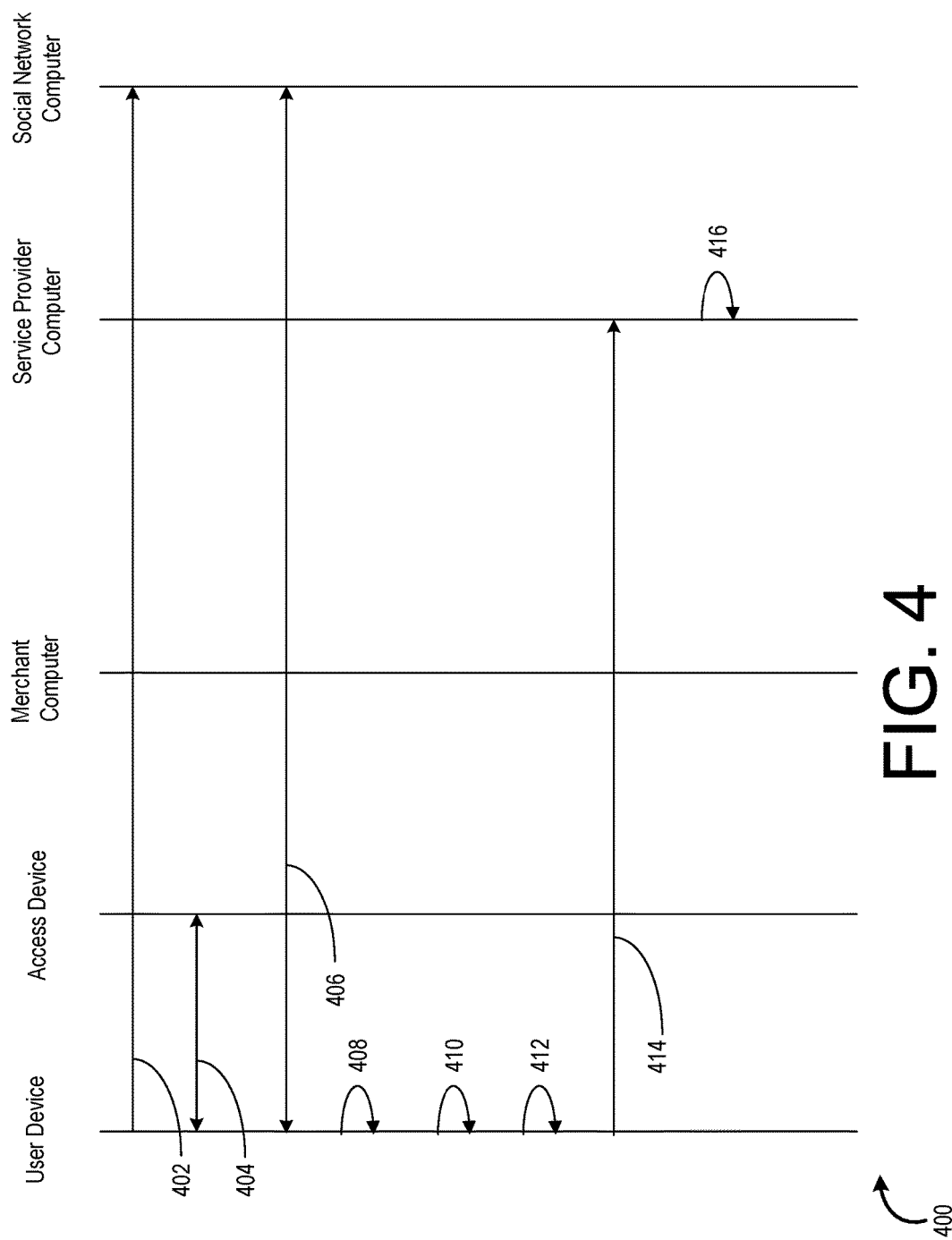
FIG. 4 depicts a diagram illustrating an example technique for biometric authentication utilizing a dynamic biometric template, in accordance with some embodiments of the invention.

FIG. 4 depicts a flow diagram illustrating an example technique for biometric authentication utilizing a dynamic biometric template, in accordance with some embodiments of the invention. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 (as well as the other Figures in this application) may be performed by at least the one or more computer systems including access device 104, user device 114, service provider computer 112, social network server computer 118 (FIG. 1), user device computer 200 including modules 210-214, or social media provider computer 300 including modules 310-314. The code may be stored on a computer-readable storage medium, for example, in the form of a computer program including a plurality of instructions executable by one or more processors. The computer-readable storage medium may be non-transitory.

The process 400 may include a user uploading, sharing, or providing social media content (e.g., videos, images, text, pictures, links, interactivity, etc.) to a social network computer associated with a social media provider at 402. In some embodiments, the process 400 may include the user initiating authentication for themselves or the user device at 404. The user may provide biometric data (i.e., a picture of themselves taken with the user device) utilizing hardware features associated with the user device. In some embodiments, the authentication may be part of a payment transaction and include information about the transaction. In some examples, the authentication request may be transmitted via an access device or directly by the user device to a service provider computer. In some embodiments, the user device is configured to utilize a software application provided by the service provider computer, during a registration step or initialization of the user device with the service provider computer, to provide biometric data and generate a dynamic biometric template for authentication.

The process 400 may include the software application of the user device receiving or obtaining social media content associated with the user from the social network computer at 406. In some embodiments, the user device and software application may receive social media content from a particular social network associated with the user or from a plurality of social networks that the user provides or shares content to. The process 400 may include the user device and software application generating the dynamic biometric template utilizing the social media content associated with the user at 408. The dynamic biometric template may be updated as the user shares or provides more social media content. The user device may store the biometric template for future authentication requests and maintain a plurality of biometric templates for varying biometric modalities (i.e., eyes, facial image, voice recognition).

The process 400 may also include the user providing a biometric sample to the user device, and then the user device and service provider application compares the biometric data provided by the user to the generated biometric template at 410.

In some embodiments, the process 400 may include the user device and software application calculating or determining a confidence score for the comparison of the biometric data to the generated biometric template at 412. The confidence score may represent the degree of similarity between the biometric data provided by the user and the biometric template generated from the social media content associated with the user. In some embodiments, the process 400 may include the user device and software application providing the confidence score to the service provider computer at 414. The process 400 may include the service provider authenticating the user or the user device at 416 by utilizing the confidence score and a threshold for the authentication as described herein. Although FIG. 4 illustrates the user device and software application providing the confidence score to the service provider computer for authentication processing, in some embodiments the user device and software application may be configured to authenticate the user device with the confidence score and one or more thresholds maintained on the user device. Subsequent to the authentication of the user device the user device and access device may provide transaction information about a transaction, such as merchant identification information, transaction amount, product identifiers, or other suitable transaction information, in conjunction with the verified user device information to the service provider computer for payment transaction processing as described herein.

Figure 5:
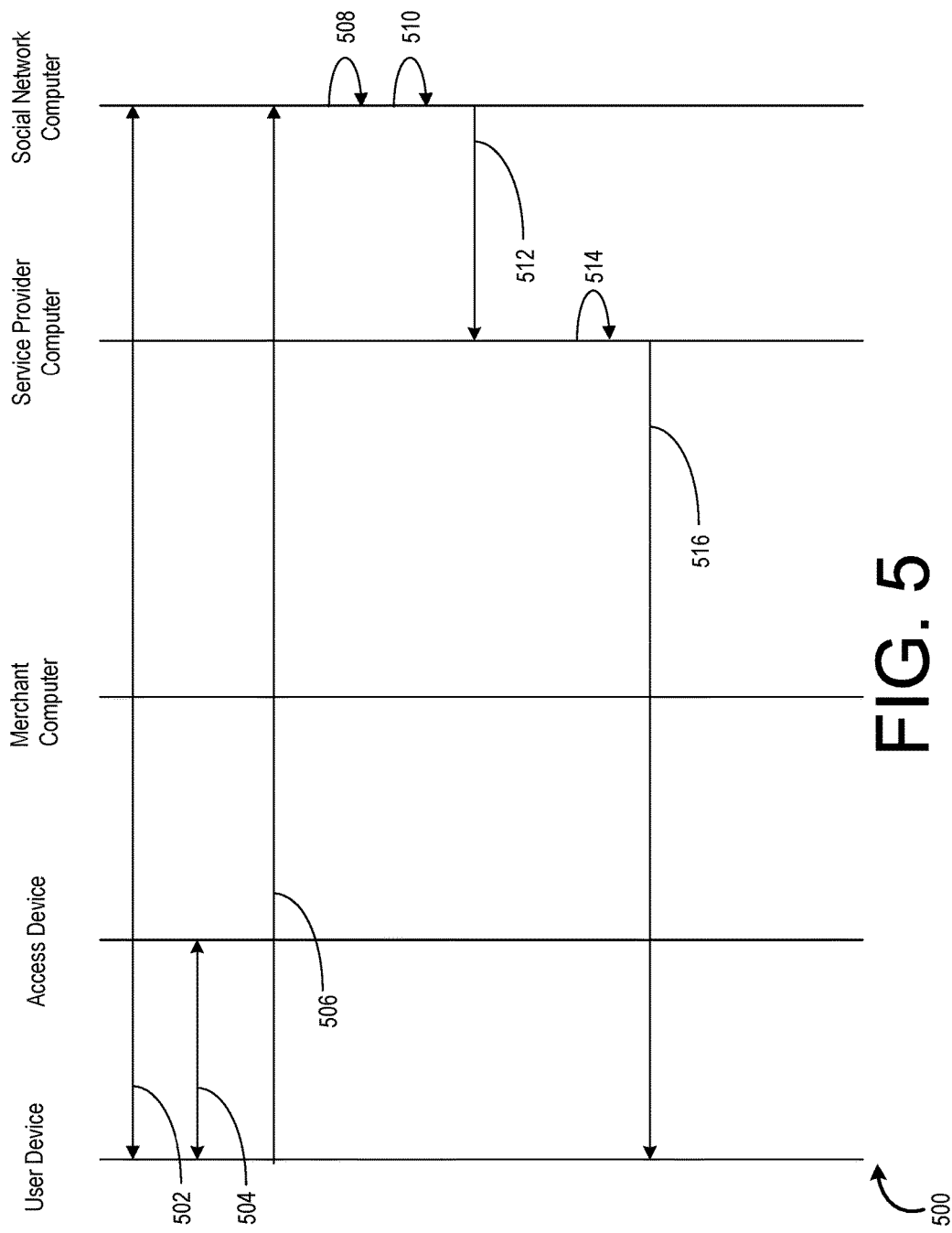
FIG. 5 depicts a diagram illustrating an example technique for biometric authentication utilizing a dynamic biometric template, in accordance with some embodiments of the invention.

FIG. 5 depicts a flow diagram illustrating an example technique for biometric authentication utilizing a dynamic biometric template, in accordance with some embodiments of the invention.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the one or more computer systems including access device 104, user device 114, service provider computer 112, social network server computer 118 (FIG. 1), user device computer 200 including modules 210-214, or social media provider computer 300 including modules 310-314. The code may be stored on a computer-readable storage medium, for example, in the form of a computer program including a plurality of instructions executable by one or more processors. The computer-readable storage medium may be non-transitory.

The process 500 may include a user uploading, sharing, or providing social media content (e.g., videos, images, text, pictures, links, interactivity, etc.) to a social network computer associated with a social media provider at 502. In some embodiments, the process 500 may include the user initiating authentication for themselves or the user device at 504. The user may provide biometric data (i.e., a picture of themselves taken with the user device) utilizing hardware features associated with the user device. In some embodiments, the authentication may be part of a payment transaction and include information about the transaction. In some examples, the authentication request may be transmitted via an access device or directly by the user device to a service provider computer. In some embodiments, the user device is configured to utilize a software application provided by the service provider computer, during a registration step or initialization of the user device with the service provider computer, to provide biometric data and generate a dynamic biometric template for authentication. The user device and access device may initiate the authentication request process as part of a payment transaction process as described herein. For example, the user may receive a prompt to provide the biometric data in response to interacting with a POS terminal (access device) of a merchant. As another example, the user may be prompted or receive a request to provide biometric data via the user device in response to ordering an item in an e-commerce environment (online merchandise purchasing). The process 500 may include the user device providing the biometric data of the authentication request to the social network computer at 506.

The process 500 may include the social media provider generating the dynamic biometric template for the user based on the social media content associated with the user at 508. In some embodiments, a particular social media provider and associated social network computer may be selected by the user for the biometric authentication process. In some examples, the service provider may select the appropriate social network computer and social media provider based on the user activity with the associated social media network. The dynamic biometric template may be continually updated as the user shares or provides more social media content to the social network computer. The social network computer may update and maintain the biometric template for future authentication requests and maintain a plurality of biometric templates for varying biometric modalities (i.e., eyes, facial image, voice recognition). In some embodiments, the social network computer may maintain and update the biometric template for a user and a plurality of users in an associated database or data store. In some embodiments, the social network computer may pre-generate a biometric template that is transmitted to the service provider computer or user device for use in maintaining and updating a dynamic biometric template.

In some embodiments, the process 500 may include the social network computer comparing the biometric data provided by the user to the biometric template and generating a confidence score of the comparison at 510. The confidence score may represent the degree of similarity between the biometric data provided by the user and the biometric template generated from the social media content associated with the user. The process 500 may include the social network computer providing the calculated confidence score to the service provider computer at 512. In some embodiments, the process 500 may include the service provider verifying the authentication of the user and user device or authenticating the payment transaction based on the confidence score at 514. The process 500 may also include the service provider transmitting an authentication response to a message indicating the verification or non-verification of the user device at 516. In some embodiments, the service provider computer may utilize the confidence score generated by the social network computer and a threshold to determine whether the user device is authenticated. In some embodiments, the authentication of the user device may be part of a payment processing transaction and the service provider may generate and transmit an authorization response message as described herein.

Figure 6:
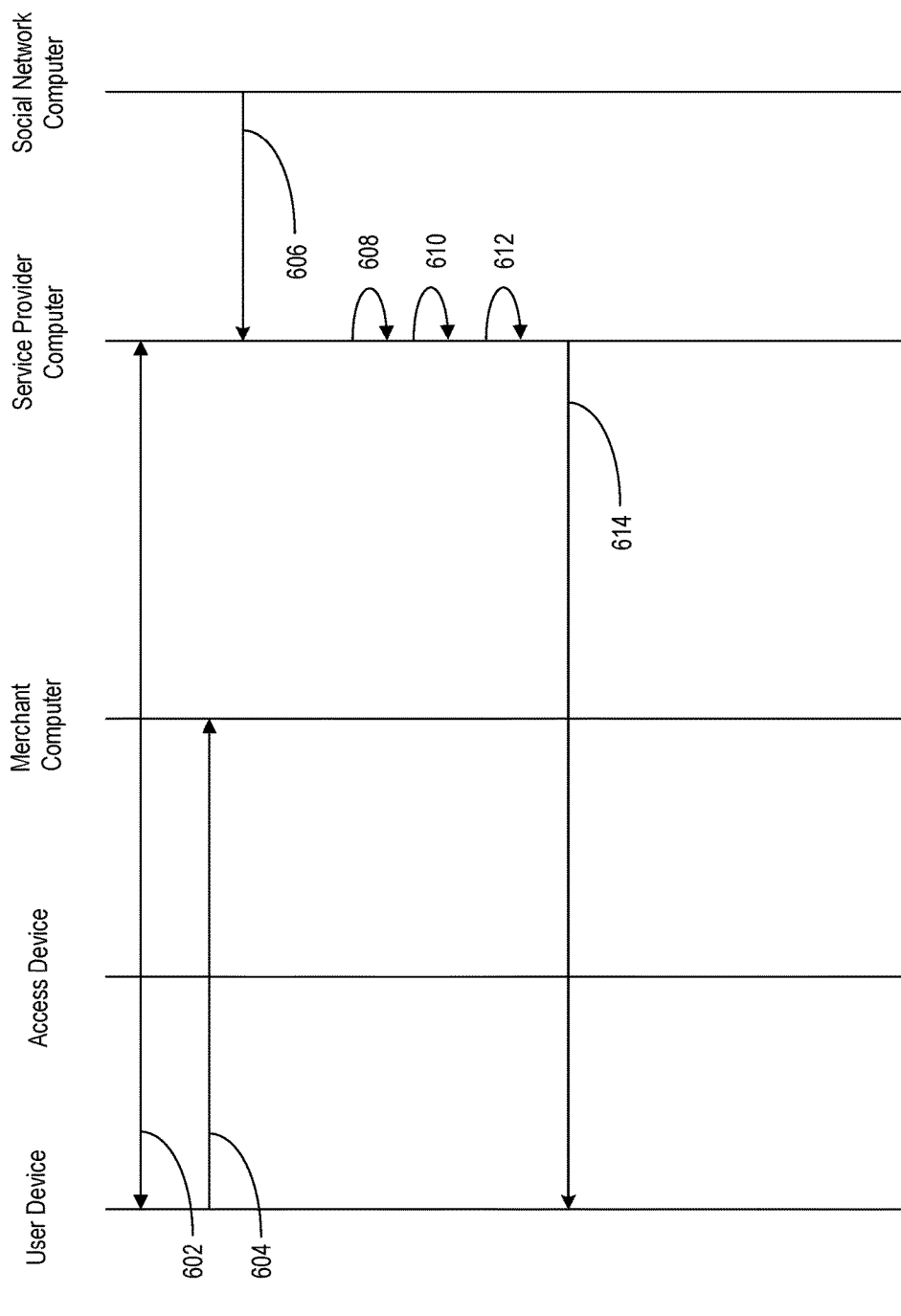
FIG. 6 depicts a diagram illustrating an example technique for biometric authentication utilizing a dynamic biometric template, in accordance with some embodiments of the invention.

FIG. 6 depicts a flow diagram illustrating an example technique for biometric authentication utilizing a dynamic biometric template, in accordance with some embodiments of the invention.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more computer systems including access device 104, user device 114, service provider computer 112, social network server computer 118 (FIG. 1), user device computer 200 including modules 210-214, or social media provider computer 300 including modules 310-314. The code may be stored on a computer-readable storage medium, for example, in the form of a computer program including a plurality of instructions executable by one or more processors. The computer-readable storage medium may be non-transitory.

In some embodiments, the process 600 may include the user initiating authentication for themselves or the user device at 602. The user may provide biometric data (i.e., a picture of themselves taken with the user device) utilizing hardware features associated with the user device in the authentication request. In some embodiments, the authentication may be part of a payment transaction and include information about the transaction. In some examples, the authentication request may be transmitted via an access device or directly by the user device to a merchant computer at 604 as part of a payment transaction authentication. In embodiments, the merchant computer may be configured to transmit the authentication request to the service provider computer for verification purposes. In some embodiments, the user device is configured to utilize a software application provided by the service provider computer, during a registration step or initialization of the user device with the service provider computer, to provide biometric data as part of the biometric authentication process described herein.

The process 600 may include the service provider computer receiving or obtaining social media content associated with the user from the social network computer at 606. In some embodiments, the process 600 includes the service provider computer generating the dynamic biometric template utilizing the social media content associated with the user from the social network computer at 608. The dynamic biometric template may be updated as the user shares or provides more social media content and the service provider computer receives the social media content. The service provider computer may store the biometric template for future authentication requests and maintain a plurality of biometric templates for varying biometric modalities (i.e., eyes, facial image, voice recognition). The process 600 may also include the service provider computer comparing the biometric data provided by the user to the generated biometric template at 610.

The process 600 further includes the service provider determining a confidence score at 612 that represents the degree of similarity between the biometric data provided by the user and the biometric template generated from the social media content associated with the user. In some embodiments, the process 600 may include the service provider computer authenticating the user or the user device at 614 by utilizing the confidence score and a threshold for the authentication as described herein. In some examples, the service provider computer may provide the verification or authentication determination to the user device, the access device, or merchant computer in embodiments that include a payment transaction as described herein. In some embodiments, the service provider computer may transmit the confidence score of the comparison between the biometric data and the biometric template to the user device or access device. In some embodiments, the service provider computer may maintain authentication history information identifying time periods that authentication requests were made and results of the authentication request including the calculated confidence score and threshold utilized for the particular authentication request. In embodiments, the service provider computer may generate or maintain one or more thresholds based on characteristics associated with historic authentication requests. For example, information identifying the characteristics may include information about the user device utilized to provide the biometric data for authentication requests, information about a first time period between authentication requests, information about a second time period between authentication requests that utilize a particular type of biometric data (facial image vs. voice recognition), or location data of the user device that was utilized to provide the biometric data. In some embodiments, the service provider computer may utilize the confidence score and the one or more thresholds for verification and authentication purposes as described herein.

Figure 7:
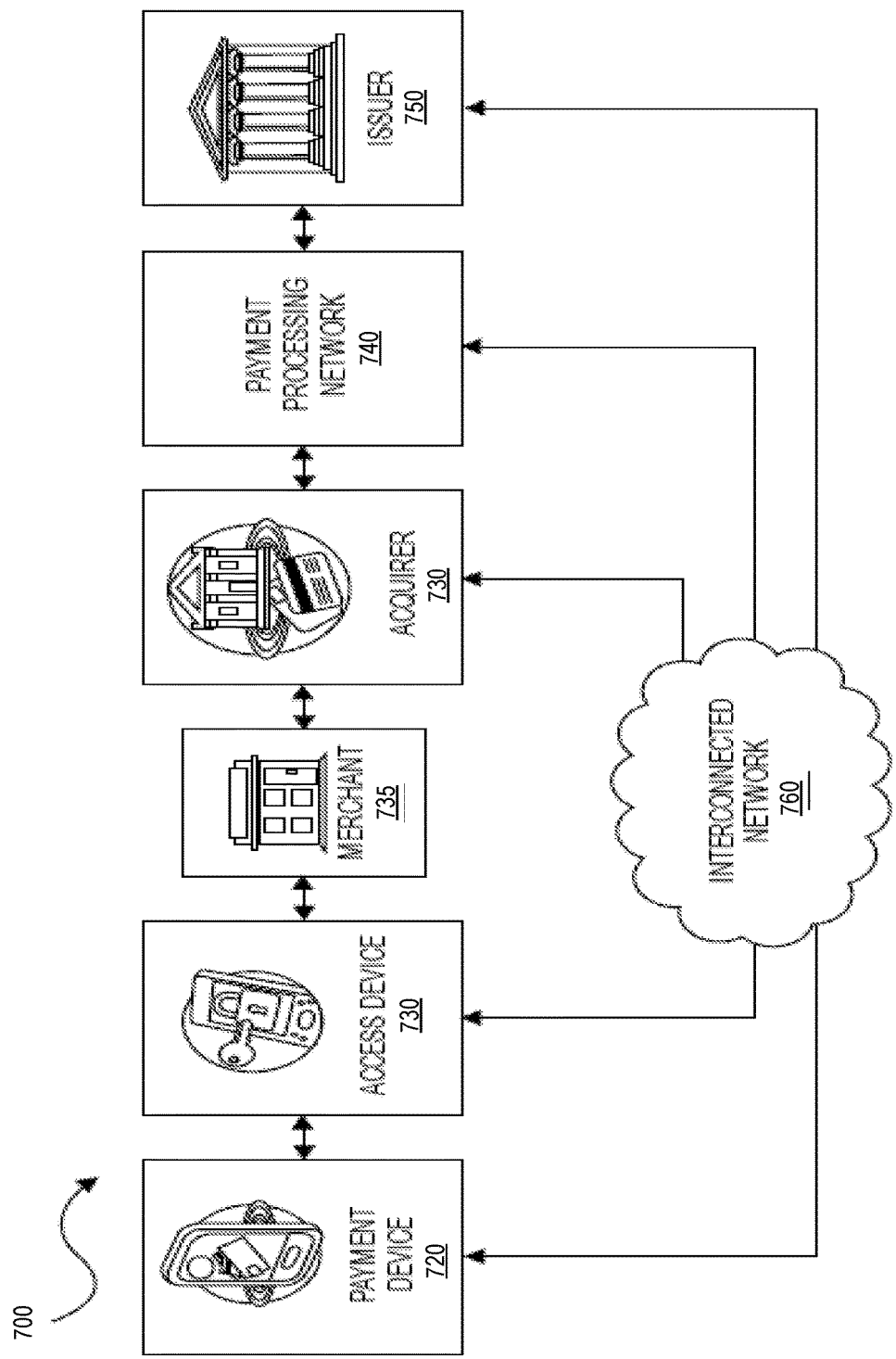
FIG. 7 depicts a block diagram of an exemplary payment system, in accordance with some embodiments of the invention.

FIG. 7 depicts a block diagram of an exemplary payment system that may utilize the herein described biometric authentication system, in accordance with some embodiments of the invention. The system 700 may include a payment device 720, an access device 730, a merchant computer 735, an acquirer computer 730, a payment processing network computer 740, and an issuer computer 550. In some implementations, different entities in FIG. 7 may communicate with each other using one or more communication networks such as the Internet, a cellular network, a TCP/IP network or any other suitable communication network. Note that one or more entities in the system 700 may be associated with a computer apparatus that may be implemented using some of the components as described with reference to FIG. 8. The system shown in FIG. 7 and the payment process described below may be integrated with the authentication flows depicted in and described with respect to any of FIGS. 4-6.

The payment device 720 may be associated with a payment account of a user. In some implementations, the payment device 720 may be a mobile device such as a mobile phone, a tablet, a PDA, a notebook, a key fob, a vehicle such as an automobile, or any suitable mobile device. In some embodiments, the payment device 720 may be a wearable device such as, but not limited to, a smart watch, a fitness band, an ankle bracelet, a ring, earrings, etc. For example, the payment device 720 may include a virtual wallet or a payment application that may be associated with one or more payment accounts of the user. In some implementations, the payment device 720 may be capable of communicating with the access device 730 using a wireless data protocol such as WI-FI™ or Bluetooth™. For example, the payment device 720 may interact with the access device 730 by establishing a connection with the access device 730 using a wireless data protocol. In some embodiments, the payment device 720 may be a plastic card linked to a user account.

The access device 730 may be an access point to a transaction processing system that may comprise the acquirer computer 730, the payment processing network computer 740, and the issuer computer 750. In some implementations, the access device 730 may be associated with or operated by the merchant computer 735. For example, the access device 730 may be a point of sale device that may include a contactless reader, an electronic cash register, a display device, etc. In some implementations, the access device 730 may be configured to transmit information pertaining to one or more purchased items at a merchant 735 to an acquirer 730 or payment processing network 740. In some implementations, the access device 730 may be a personal computer that may be used by the user to initiate a transaction with the merchant computer 735 (e.g., an online transaction). In some implementations, the access device may be configured to interface with a biometric reader to obtain biometric data pertaining to a biometric sample provided by a user.

The acquirer computer 730 may be operated by an acquirer. The acquirer is typically a system for an entity (e.g., a bank) that has a business relationship with a particular merchant, a wallet provider or another entity. The acquirer computer 730 may be communicatively coupled to the merchant computer 735 and the payment processing network 740 and may issue and manage a financial account for the merchant. The acquirer computer 730 may be configured to route the authorization request for a transaction to the issuer computer 750 via the payment processing network computer 740 and route an authorization response received via the payment processing network computer 740 to the merchant computer 735.

The payment processing network computer 740 may be configured to provide authorization services, and clearing and settlement services for payment transactions. The payment processing network computer 740 may include data processing subsystems, wired or wireless networks, including the internet. An example of the payment processing network computer 740 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 740 may include a server computer. In some implementations, the payment processing network computer 740 may forward an authorization request received from the acquirer computer 730 to the issuer computer 750 via a communication channel. The payment processing network computer 740 may further forward an authorization response message received from the issuer computer 750 to the acquirer computer 730. In some implementations, the payment processing network 740 may operate the service provider computer 112 (FIG. 1) or provide a software application configured to run on the access device 104, user device 114 (FIG. 1), or modules 210-214 of user device computer 200 (FIG. 2).

The issuer computer 750 may represent an account issuer and/or an issuer processor. Typically, the issuer computer 750 may be associated with a business entity (e.g., a bank) that may have issued an account and/or payment card (e.g., credit account, debit account, etc.) for payment transactions. In some implementations, the business entity (bank) associated with the issuer computer 750 may also function as an acquirer (e.g., the acquirer computer 730).

The issuer computer 750 and/or the payment processing network computer 740 may operate as authorization systems in some embodiments of the invention. For example, a transaction may be authorized by the issuer computer 750 and/or the payment processing network computer 740 upon successful biometric authentication by the user utilizing the dynamically generated biometric template derived from social media content associated with the user and biometric data provided by the user as disclosed herein.

The various entities in the system 700 may communicate with each other via an interconnected network 760, e.g., the Internet.

In some embodiments, the access device 730 may include or have a biometric reader coupled to it. After the payment device 720 interacts with the access device 730, the access device 730 may receive a biometric sample from the user as described above, and the user may be authenticated before the user is allowed to proceed with a payment transaction. Alternatively or additionally, the payment device 720 could request user authentication as described above, and could receive a confidence score as described above. Once the user is verified, the access device 730 may generate or obtain a confidence score from a remote computer or from the payment device, and may then generate an authorization request message which may pass to the issuer 750 via the acquirer 730 and the payment processing network 740. In some embodiments, the issuer 750, acquirer 730 and/or the payment processing network 750 could receive the confidence score and could decline the transaction if the confidence score is not satisfactory. The issuer 750 may then authorize the transaction, and may return an authorization response message back to the access device 730 via the payment processing network 740 and the acquirer 730. At the end of the day or any other suitable time period, a clearing and settlement process may take place.

In some embodiments, a user device computer 200 (FIG. 2) may be utilized to submit the biometric sample or biometric data from the user to begin the authorization and verification of the user identity prior to the generation of an authorization request message. In some embodiments, the user device computer 200 (FIG. 2) may provide the biometric sample or biometric data from the user to the access device 730 which is then subsequently provided to the payment processing network 740 for verification by utilizing the dynamically generated biometric template derived from social media content associated with the user.

The various participants and elements described herein with reference to FIGS. 1-6 may operate one or more computer apparatuses to facilitate the functions described herein. Any of the elements in FIGS. 1-6, including any servers or databases, may use any suitable number of subsystems to facilitate the functions described herein.

Figure 8:
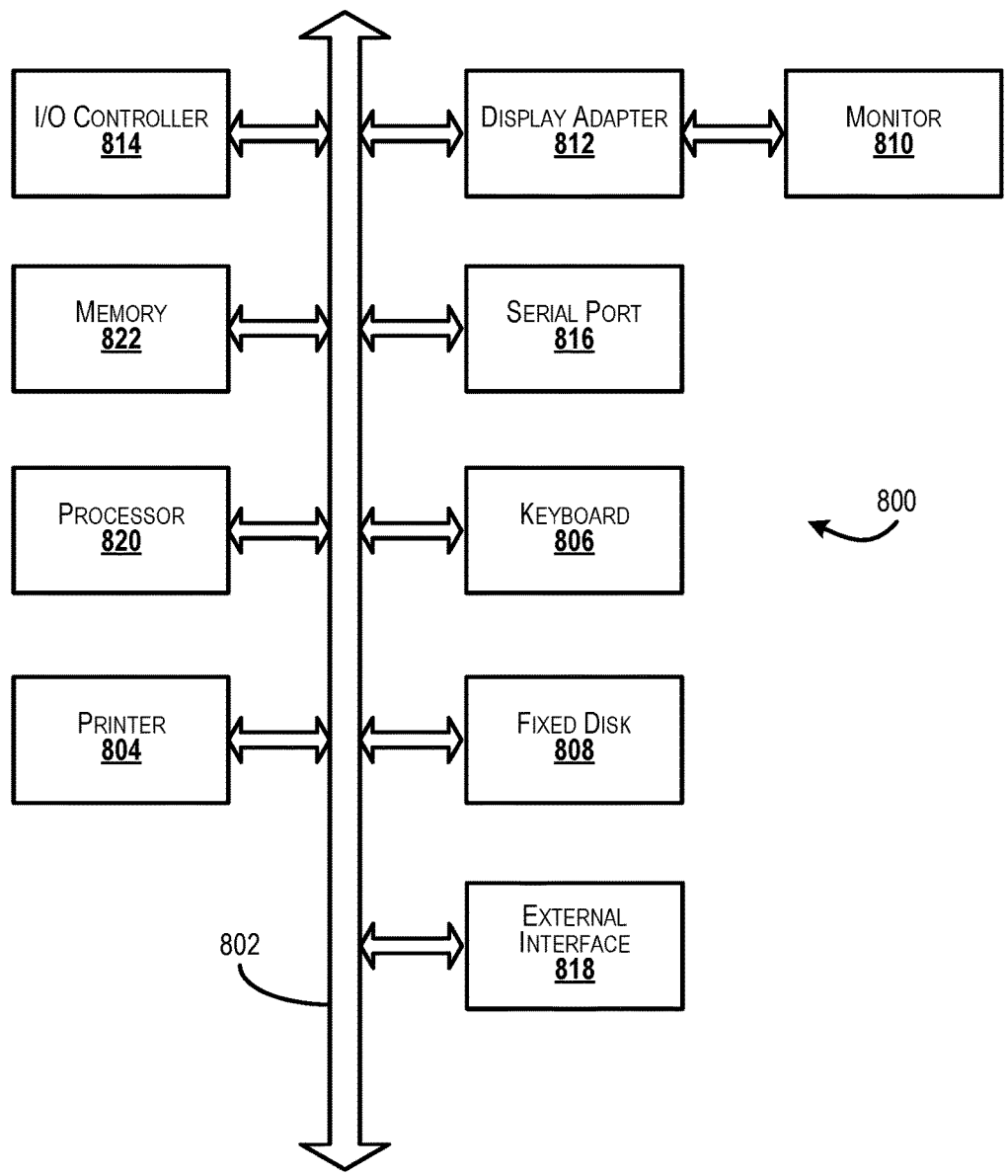
FIG. 8 depicts aspects of elements that may be present in a computer device and/or system configured to implement a method and/or process for biometric authentication, in accordance with some embodiments of the invention.

Examples of such subsystems or components are shown in FIG. 8. The subsystems shown in FIG. 8 are interconnected via a system bus 802. Additional subsystems such as a printer 804, keyboard 806, fixed disk 808 (or other memory comprising computer readable media), monitor 810, which is coupled to display adapter 812, and others are shown. Peripherals and input/output (I/O) devices, which couple to I/O controller 814 (which can be a processor or other suitable controller), can be connected to the computer system by any number of means known in the art, such as serial port 816. For example, serial port 816 or external interface 818 can be used to connect the computer apparatus to a wide area network such as the Internet, a mouse input device, or a scanner. The interconnection via system bus allows the central processor 820 to communicate with each subsystem and to control the execution of instructions from system memory 822 or the fixed disk 808, as well as the exchange of information between subsystems. The system memory 822 and/or the fixed disk 808 may embody a computer readable medium.

Embodiments of the invention have a number of advantages. For example, because a biometric template can be continually updated with social media images (e.g., photos, videos) a very up to date biometric template of a user may be maintained. This up to date biometric template may be used to authenticate a user for any suitable type of transaction including a payment transaction, an access transaction (e.g., to enter a venue or location), or a transaction to obtain a resource (e.g., a document or access to data). Further, because data from a social network is being leveraged, embodiments of the invention do not require significant changes to existing systems so that embodiments of the invention can be implemented without difficulty.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for biometric authentication, comprising:
   receiving, by a server computer, an authentication request, the authentication request comprising biometric data provided by the user;
   transmitting, by the server computer, the biometric data to a social network server computer, wherein the social network server computer thereafter compares the biometric data of the user to a biometric template to calculate a confidence score based at least in part on first information indicating a level of activity of the user with a Web Site provided by the social network server computer and second information identifying environmental variations in how social media content is shared by the user on the Web Site, the biometric template dynamically generated in response to receiving the biometric data and based at least in part on the social media content shared by the user on the Web Site provided by the social network server computer, the biometric template configured to update based at least in part on updated social media content shared by the user, wherein the environmental variations include a type of data file and facial expressions of the user, the type of data file comprising image content, video content, audio content, or uploaded content;
   receiving, by the server computer, the confidence score from the social network server computer;
   identifying, by the server computer, a threshold from one or more thresholds based at least in part on a plurality of characteristics associated with the authentication request, the plurality of characteristics including a time period between the authentication request using a particular type of the biometric data and previous authentication requests using the particular type of the biometric data, and further including a current location of the user during the authentication request; and
   verifying the authentication request based at least in part on the confidence score and the threshold.

2. The method of claim 1, further comprising:
   creating a fraud score based at least in part on the confidence score and a fraud threshold; and
   updating a fraud database using the fraud score, the fraud database maintained by the server computer.

3. The method of claim 1, wherein the authentication request is received from an access device, and wherein the authentication request is in a form of an authorization request message that requests authorization for a transaction, and wherein the method further includes transmitting, by the server computer, an authorization response message to the access device.

4. The method of claim 3, further comprising determining, by the server computer, the threshold for the transaction.

5. The method of claim 4, wherein the threshold is updated based at least in part on the social media content shared by the user.

6. The method of claim 1, wherein the social media content shared by the user on the Web Site includes at least one of the video content, the audio content, the image content, text content, user provided input, or user provided activity with the Web Site.

7. The method of claim 1, wherein the biometric data is provided by the user via a user device.

8. An electronic device comprising:
a processor; and
a memory including instructions that, when executed with the processor, cause the system to, at least:
receive an authentication request comprising biometric data provided by a user;
receive, from a social network server computer, social media content associated with the user of the electronic device, first information, and second information, the social media content being shared on a social networking Web Site provided by the social network server computer, the first information indicating a level of activity of the user with the social networking Web Site, the second information identifying environmental variations in how the social media content is shared by the user on the social networking Web Site, the environmental variations including a type of data file and facial expressions of the user, the type of data file comprising image content, video content, audio content, or uploaded content;
generate a biometric template based at least in part on the social media content of the user, the biometric template dynamically updated based on new social media content associated with the user;
determine a confidence score for a comparison of the biometric data to the biometric template based at least in part on an authentication request for the user, the first information, and the second information the confidence score representing a similarity between the biometric data and the biometric template;
identify a threshold from one or more thresholds based at least in part on a plurality of characteristics associated with the authentication request, the plurality of characteristics including a time period between the authentication request using a particular type of the biometric data and previous authentication requests using the particular type of the biometric data, and further including a current location of the user during the authentication request; and
verify the authentication request for the user based at least in part on the confidence score and the threshold.

9. The electronic device of claim 8, wherein the instructions when executed with the processor cause the system to further at least request, from a particular social network server computer, the social media content associated with the user, the particular social network server providing particular social networking software.

10. The electronic device of claim 8, wherein the dynamically updated biometric template is stored in a protected area of the memory of the electronic apparatus.

11. The electronic device of claim 10, wherein the instructions when executed with the processor cause the system to further at least receive a selection by the user of particular social media content to utilize when generating the biometric template.

12. The electronic device of claim 8, wherein the biometric data includes at least one of a voice sample, an iris scan, hand geometry, or a facial image sample.

13. The electronic device of claim 8, wherein generating the biometric template occurs during an offline mode or based on network connection conditions for the electronic device.

14. A method for biometric authentication, comprising:
receiving, at a server computer, an authentication request for a user associated with an access device, the authentication request comprising biometric data provided by the user;
receiving, by the server computer and from a social network service computer, social media content associated with the user, first information indicating a level of activity of the user with the social network service computer, and second information identifying environmental variations in how the social media content is shared by the user on the social network service computer, the environmental variations including a type of data file and facial expressions of the user, the type of data file comprising image content, video content, audio content, or uploaded content;
generating, by the server computer, a biometric template for the user based at least in part on the social media content, the biometric template continually updated based at least in part on new social media content associated with the user;
determining, by the server computer, a confidence score based at least in part on a comparison of the biometric data and the biometric template, the first information, and the second information;
identifying, by the server computer, a threshold from one or more thresholds based at least in part on a plurality of characteristics associated with the authentication request, the plurality of characteristics including a time period between the authentication request using a particular type of the biometric data and previous authentication requests using the particular type of the biometric data, and a current location of the user during the authentication request; and
verifying the authentication request for the user based at least in part on the confidence score and the threshold.

15. The method of claim 14, wherein the information identifying the characteristics of the authentication request includes at least one of user device information about the user device utilized to provide the biometric data from the user, a first time period between authentication requests, or a location of the user device utilized to provide the biometric data from the user.

16. The method of claim 14, wherein the biometric template is pre-generated by the social network service computer and wherein the server computer updates the biometric template by incorporating the pre-generated biometric template.

17. The method of claim 14, wherein generating the biometric template comprises updating the biometric template at periodic intervals.

* * * * *